United States Patent
Lindstrom

(10) Patent No.: US 9,181,738 B2
(45) Date of Patent: Nov. 10, 2015

(54) ONE-PIECE HINGE BODY AND HINGE ASSEMBLY FOR PIVOTING ELEMENTS

(71) Applicant: K. HARTWALL OY AB, Soderkulla (FI)

(72) Inventor: Johan Lindstrom, Soderkulla (FI)

(73) Assignee: K. Hartwall Oy Ab, Söderkulla (FI)

( * ) Notice: Subject to any disclaimer, the term of this patent is extended or adjusted under 35 U.S.C. 154(b) by 0 days.

(21) Appl. No.: 14/391,932

(22) PCT Filed: Mar. 14, 2013

(86) PCT No.: PCT/FI2013/050290
§ 371 (c)(1),
(2) Date: Oct. 10, 2014

(87) PCT Pub. No.: WO2013/150179
PCT Pub. Date: Oct. 10, 2013

(65) Prior Publication Data
US 2015/0143665 A1    May 28, 2015

(30) Foreign Application Priority Data

Apr. 3, 2012    (EP) .................................... 12162920

(51) Int. Cl.
*E05D 5/02*    (2006.01)
*E05D 1/02*    (2006.01)
*E05D 1/04*    (2006.01)
(Continued)

(52) U.S. Cl.
CPC .. *E05D 1/02* (2013.01); *E05D 1/04* (2013.01); *E05D 5/14* (2013.01); *E05D 7/00* (2013.01);
(Continued)

(58) Field of Classification Search
CPC ........... H02G 3/32; F16L 3/237; F16L 3/233; F16L 3/2336; F16L 3/2338; B60R 16/0207; B60R 16/0215; E05D 5/02; E05D 5/023; E05D 5/0238; E05D 5/127; E05D 5/128; E05D 3/12; E05D 3/14; E05D 3/16; E05D 7/08; E05D 7/081; E05Y 2900/40

USPC .......... 16/252, 253, 225, 227, 365, 366, 86.1; 24/326, 327, 335, 336, 339; 248/62, 248/68.1, 73, 74.1, 74.2, 74.3, 74.4, 74.5; 256/54, 65.02, 65.03, 65.04, 67, 68
See application file for complete search history.

(56) References Cited

U.S. PATENT DOCUMENTS 1,232,048 A * 7/1917 Kolkmeier ...................... 16/253
1,261,678 A * 4/1918 Barnes et al. .................... 16/253
(Continued)

FOREIGN PATENT DOCUMENTS

EP    0518540 A2    12/1992
EP    1353030 A2    10/2003
EP    1775227 A1    4/2007

OTHER PUBLICATIONS

International Search Report and Written Opinion, PCT International Application No. PCT/FI2013/050290, filed Mar. 14, 2013, K. Hartwall Oy Ab, Jun. 17, 2013, 9 pgs.

*Primary Examiner* — Chuck Mah
(74) *Attorney, Agent, or Firm* — Chernoff, Vilhauer, McClung & Stenzel, LLP

(57) ABSTRACT

The present invention provides for a robust one-piece hinge body which is suitable to withstand strain of rough handling. The novel one-piece hinge body includes a first profile portion which is configured to at least partially enclose a first profile. The hinge body also includes a second profile portion which is configured to at least partially enclose a second profile which is parallel to the first profile. The hinge body further has an outer portion which connects the first and second profile portions and which is located on the outside of the hinge joint of the pivoted profiles. The body also includes an inner portion which opposes the outer portion and connects the first and second profile portions while being located on the inside of the hinge joint of the pivoted profiles. According to the invention the inner portion consists of joinable terminal ends of the first and second profile portions, wherein a mating surface is formed between said joined terminal ends. Accordingly, the outer portion is solid for withstanding retraction upon closing movement of the hinge.

9 Claims, 7 Drawing Sheets

(51) Int. Cl.
*E05D 7/00* (2006.01)
*E05D 3/12* (2006.01)
*E05D 7/10* (2006.01)
*F16B 7/04* (2006.01)
*E05D 5/14* (2006.01)

(52) U.S. Cl.
CPC .............. *E05D 3/12* (2013.01); *E05D 7/1061* (2013.01); *E05D 2005/145* (2013.01); *E05Y 2600/00* (2013.01); *E05Y 2800/344* (2013.01); *E05Y 2900/602* (2013.01); *F16B 7/0433* (2013.01)

(56) References Cited

U.S. PATENT DOCUMENTS

| | | | | |
|---|---|---|---|---|
| 1,793,013 | A * | 2/1931 | Robertson | 16/253 |
| 2,651,806 | A * | 9/1953 | Thompson | 16/253 |
| 4,669,156 | A * | 6/1987 | Guido et al. | 24/336 |
| 4,729,149 | A * | 3/1988 | Brunkan | 16/252 |
| 5,094,578 | A * | 3/1992 | Light et al. | 411/104 |
| 5,263,671 | A * | 11/1993 | Baum | 248/68.1 |
| 5,593,143 | A * | 1/1997 | Ferrarin | 256/68 |
| 5,653,411 | A * | 8/1997 | Picco et al. | 248/74.1 |
| 5,820,048 | A * | 10/1998 | Shereyk et al. | 248/68.1 |
| 6,802,106 | B2 * | 10/2004 | Taglianetti | 16/246 |
| 6,807,710 | B2 * | 10/2004 | Abbott et al. | 16/221 |
| 6,845,970 | B1 * | 1/2005 | Kenton | 256/73 |
| 7,387,282 | B2 * | 6/2008 | Kovac | 248/74.4 |
| 2004/0051335 | A1 | 3/2004 | Erlandsson et al. | |
| 2007/0215757 | A1 * | 9/2007 | Yuta | 248/68.1 |
| 2008/0283688 | A1 | 11/2008 | Kaneko et al. | |
| 2012/0318935 | A1 * | 12/2012 | Benedetti | 248/74.1 |

* cited by examiner

ONE-PIECE HINGE BODY AND HINGE ASSEMBLY FOR PIVOTING ELEMENTS

CROSS REFERENCE TO RELATED APPLICATIONS

This is a national stage application filed under 35 USC 371 based on International Application No. PCT/FI2013/050290 filed Mar. 14, 2013.

BACKGROUND ART

The present disclosure relates to hinges. It is common to use a roll container having two fixed side wall sections in collecting items in a warehouse, whereas a four-sided roll container with doors is used to transport items from the ware house onwards. Most four-sided roll containers are assembled by adding two doors to a two-sided container. Sometimes, however, there is a need to be able to transform a two-sided roll container to a four-sided roll container by adding retro-fit doors to it. In either case, the add-on doors are typically pivoted to the upright profile of the side wall section of the roll container by means of a hinge which is arranged around and between adjacent profiles.

FIG. 7 illustrates a known one piece hinge body which a portion for enclosing a first profile and a second profile portion for enclosing a second profile parallel to the first profile. The portions for enclosing the profiles are connected by an outer portion on the outside and an inner portion on the inside of the hinge to be formed. The hinge body further comprises an extension with a hole from which the body is closed by a screw or similar joining means. However, said closing extension of the hinge body increases the outer dimensions of the hinge and therefore of the roll container. This problem could be solved with a multi-piece hinge body, as disclosed in EP 1353030 A2, but such hinge bodies are known to be prone to fail in everyday use when attempting to close the door of a roll container which has been loaded to the brimful. Most common failures are due to damages caused by closing the door of a full roll container, whereby outwardly protruding content of the container induces strain to the hinge during closing movement of the door.

It is therefore beneficial to provide a robust one-piece hinge body which does not increase the outer dimensions of hinge body.

SUMMARY

Disclosed is a novel one-piece hinge body for pivoting two parallel wall section profiles of a logistics load carrier. The novel hinge body includes a first profile portion configured to at least partially enclose a first profile. The hinge body also includes a second profile portion configured to at least partially enclose a second profile, which is parallel to the first profile. The hinge body further has an outer portion that connects the first and second profile portions and which is located on the outside of the hinge joint of the pivoted profiles. The body also includes an inner portion that opposes the outer portion and connects the first and second profile portions while being located on the inside of the hinge joint of the pivoted profiles. According to the invention, the inner portion consists of joinable terminal ends of the first and second profile portions, wherein a mating surface is formed between said joined terminal ends. Accordingly, the outer portion is solid for withstanding retraction upon closing movement of the hinge.

On the other hand, the aim is also achieved with a novel hinge assembly for pivoting two parallel profiles, wherein the assembly is formed by means of at least on such hinge body.

Considerable benefits are gained with aid of the present invention. The novel construction of the hinge body is optimized for withstanding the strain caused by handling maneuvers which most commonly lead to a failing hinge. Specifically, by having the terminal ends of the body mate at the inner portion of the hinge body, the point of discontinuity is on the inner side of the joint, whereby the surface on the outside of the joint is solid. By having a solid outer hinge body surface, the hinge body is more suitable to withstand traction caused by forcing the door to close on items not quite fitting inside the roll container.

BRIEF DESCRIPTION OF DRAWINGS

In the following, embodiments are described in greater detail with reference to the accompanying drawings in which.

DETAILED DESCRIPTION

As illustrated in FIGS. 1 to 5 and according to a disclosed exemplary embodiment, a one-piece hinge body 100 is provided such that the hinge body 100 may be opened for receiving the profiles 300, 400 to be pivoted. The hinge body 100 is made from a material that can be molded into an appropriate form, which is later described, and which material is flexible enough to allow the hinge body 100 to be opened according to FIG. 1. Suitable flexible materials which can be molded—particularly injection molded—include polyamide, polypropylene, thermoplastic urethane and similar polymers. Accordingly, the body 100 can be opened for receiving the profiles and closed for enclosing said profiles such that a sliding fit is formed between the hinge body 100 and the profiles to be pivoted, whereby a hinge is formed between said profiles Since the hinge body 100 is constructed as a one-piece component, different parts of the body are for the most part seamlessly interconnected. Portions of the hinge body 100 may, however, be distinguished.

Figure 1:
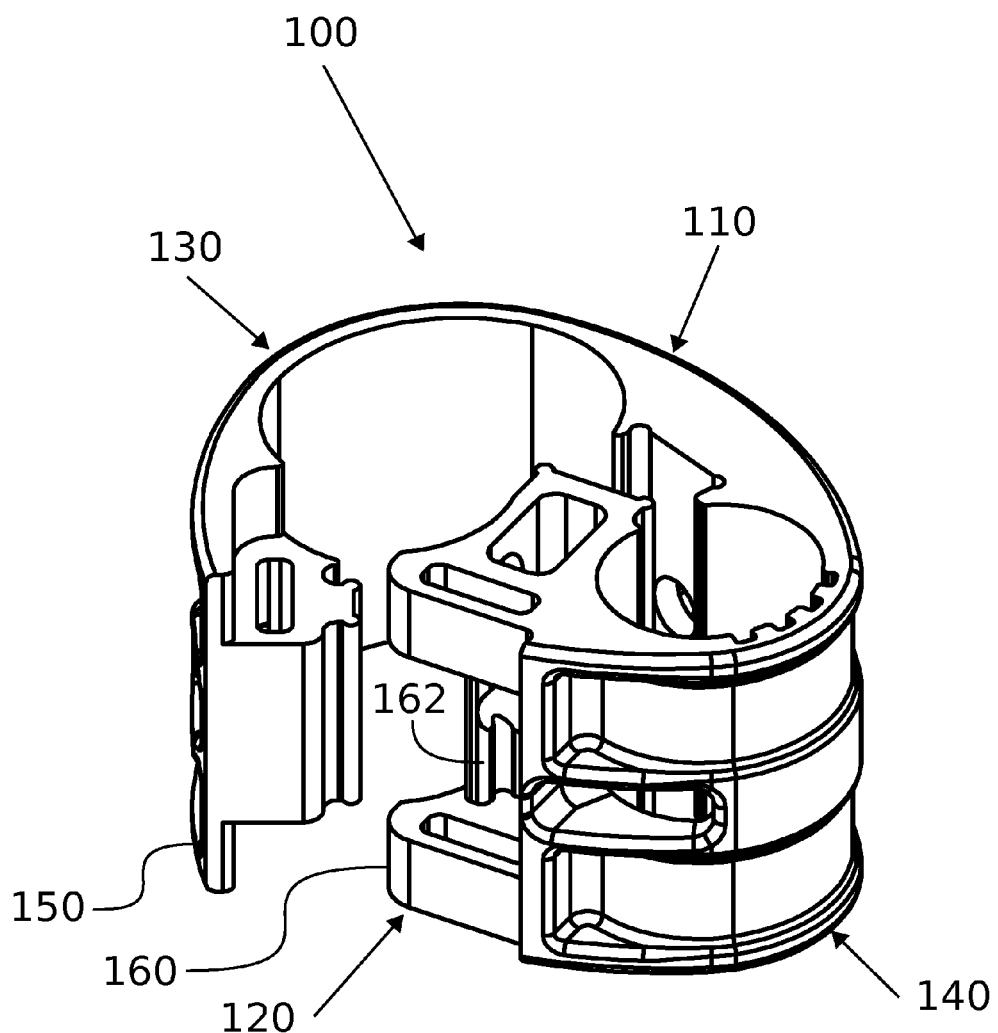
FIG. 1 presents an isometric view of an opened hinge body according to one embodiment of the invention.
Figure 2:
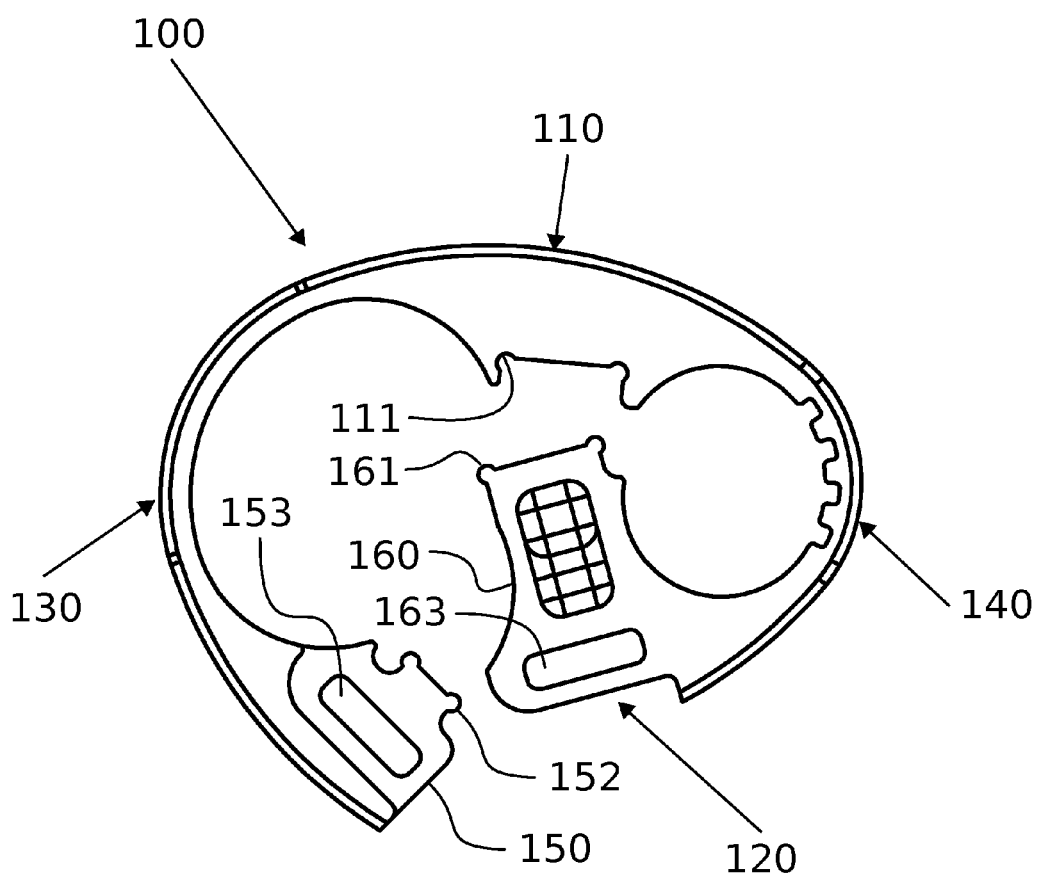
FIG. 2 presents a top elevation view of the hinge body of FIG. 1.

Referring still to FIGS. 1 and 2, the hinge body 100 can seen to include four main portions. In the top left corner of FIG. 1, the hinge body 100 includes a first profile portion 130, which is an arcuate section of the body which is configured to at least partially enclose a first profile 300 (cf. FIG. 5). In the example illustrated in the Figs., the first profile 300 is a vertical frame member of the side wall section of a roll container. In the right bottom corner of FIG. 1, a second profile portion 140 of the hinge body 100 is shown. The second profile portion 140 opposes the first profile portion 130 and is also a similar arcuate section which is configured to at least partially enclose a second profile 400 (cf. FIG. 5). In the example illustrated in the Figs., the second profile 400 is a vertical frame member of a door, for the roll container. The first and second profile portions 130, 140 are dimensioned such to form an enveloping outer surface for the contact between the hinge and the pivoted elements.

Between the first and second profile portions 130, 140 there is a solid, i.e. continuous, sound, outer portion 110 which is arranged to be on the outside of the joint created by the hinge. By "outside" is meant the side having the larger radius between hinged elements in closed position. The outer portion 110 therefore connects the first and second profile portions 130, 140 and creates a sound outer surface for the hinge body, whereby the solid outer portion 100 withstands great retraction upon closing movement of the hinge. Opposing the outer portion 110, the hinge body 100 has an inner portion 120 which connects the first and second profile portions 130, 140 on the inside of the joint. The inner portion 120 is therefore located on the inside of the hinge joint of the pivoted profiles, i.e. on the side having the smaller radius between hinged elements in closed position.

As is apparent from FIGS. 1 and 2 showing the hinge body 100 in opened position, the inner portion 120 is formed by joinable terminal ends 150, 160 of the first and second profile portions 130, 140. In other words, the free extensions of the enclosing sections of the hinge body 100 are configured to be joined on the inside of the joint for closing the hinge body 100. Thus, a mating surface 200 is formed between said joined terminal ends 150, 160, whereby the outer portion 110 can be solid for withstanding retraction upon closing movement of the hinge (FIG. 4).

Figure 3:
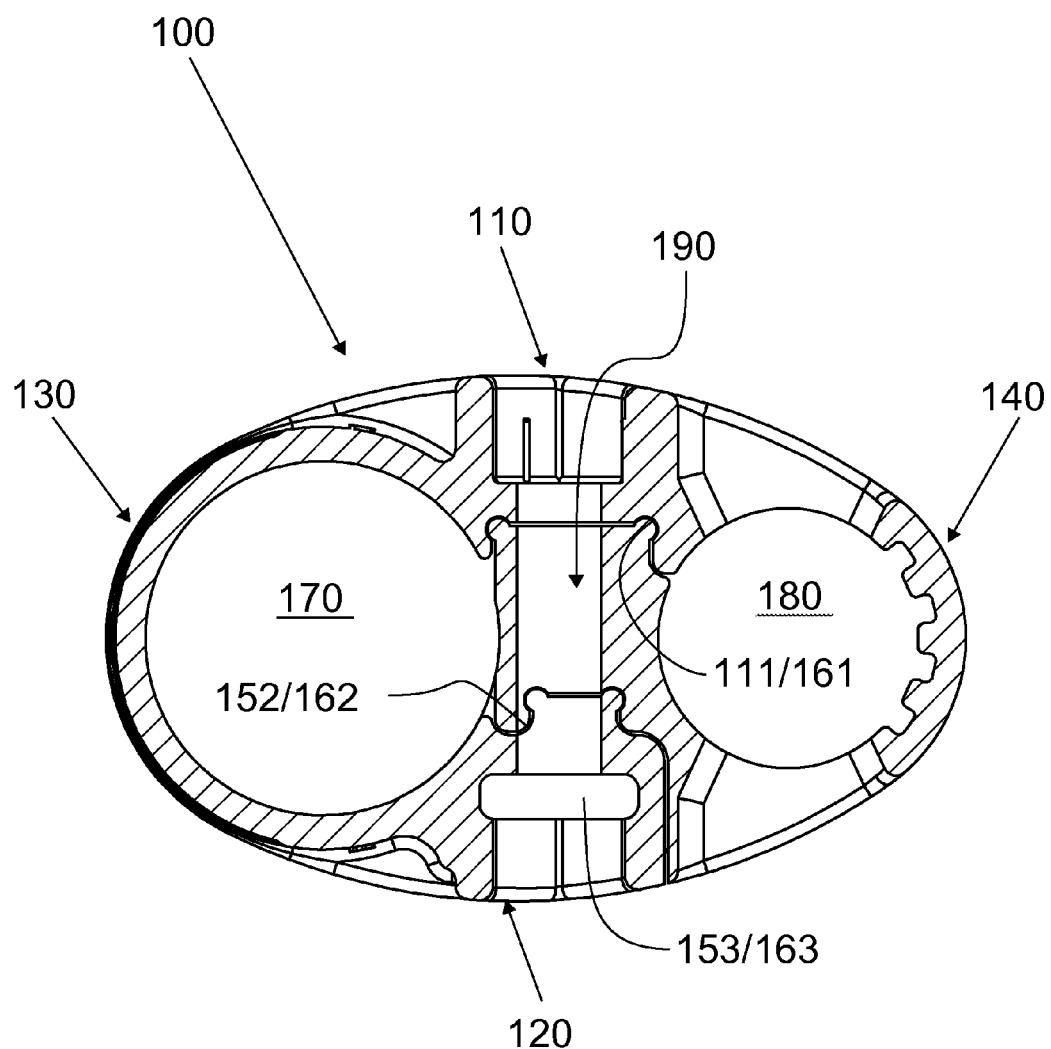
FIG. 3 presents a cross section view of the hinge body of FIG. 2.

The terminal end 160 of the second profile portion 140 is configured to be joined with the outer portion 110 of the hinge body first for fully enclosing the second profile 400. Cooperating snap fit contours 111, 161 are particularly provided to the mating surfaces of the outer portion 110 and extension of the corresponding terminal end 160 for securing the second profile in the aperture 180 thus formed (FIG. 2). With aid of the snap fit between the elements, the hinge body 100 may be attached to the second profile 400 with one hand without tools. Therefore said terminal end 160 is considered as the inner terminal end of the inner portion 120 of the hinge body 100. The inner terminal end 160 has an angled inward protruding extension which is adapted to engage with the inner surface of the outer portion 110 (FIGS. 2 and 3). The extension is shaped such that, when engaged to the outer portion 110, it together with the first and second profile portions 130, 140 defines apertures 170, 180 for enclosing the profiles. Therefore, as illustrated in FIGS. 3 and 4, the body 100 comprises two parallel apertures 170, 180 for receiving the profiles. The apertures 170, 180 are in other words separated by the extension of the inner terminal end 160.

The terminal end 150 of the first profile portion 130 is configured to close the hinge body 100 by coupling to the terminal end 160 of the second profile portion 140. As the terminal end 160 of the second profile portion 140, i.e. the inner terminal end, is attached to the outer portion 110 for enclosing the second profile 400, the terminal end 150 of the first profile portion 130, i.e. the outer terminal end 150 is configured to attach to the outer surface of the inner terminal end 160. Cooperating snap fit contours 152, 162 are particularly provided to the mating surfaces of the joined terminal ends 150, 160 for securing the first profile in the aperture 170 thus formed (FIG. 2). With aid of the snap fit between the elements, the hinge body 100 may be attached also to the first profile 300 with one hand without tools.

Figure 4:
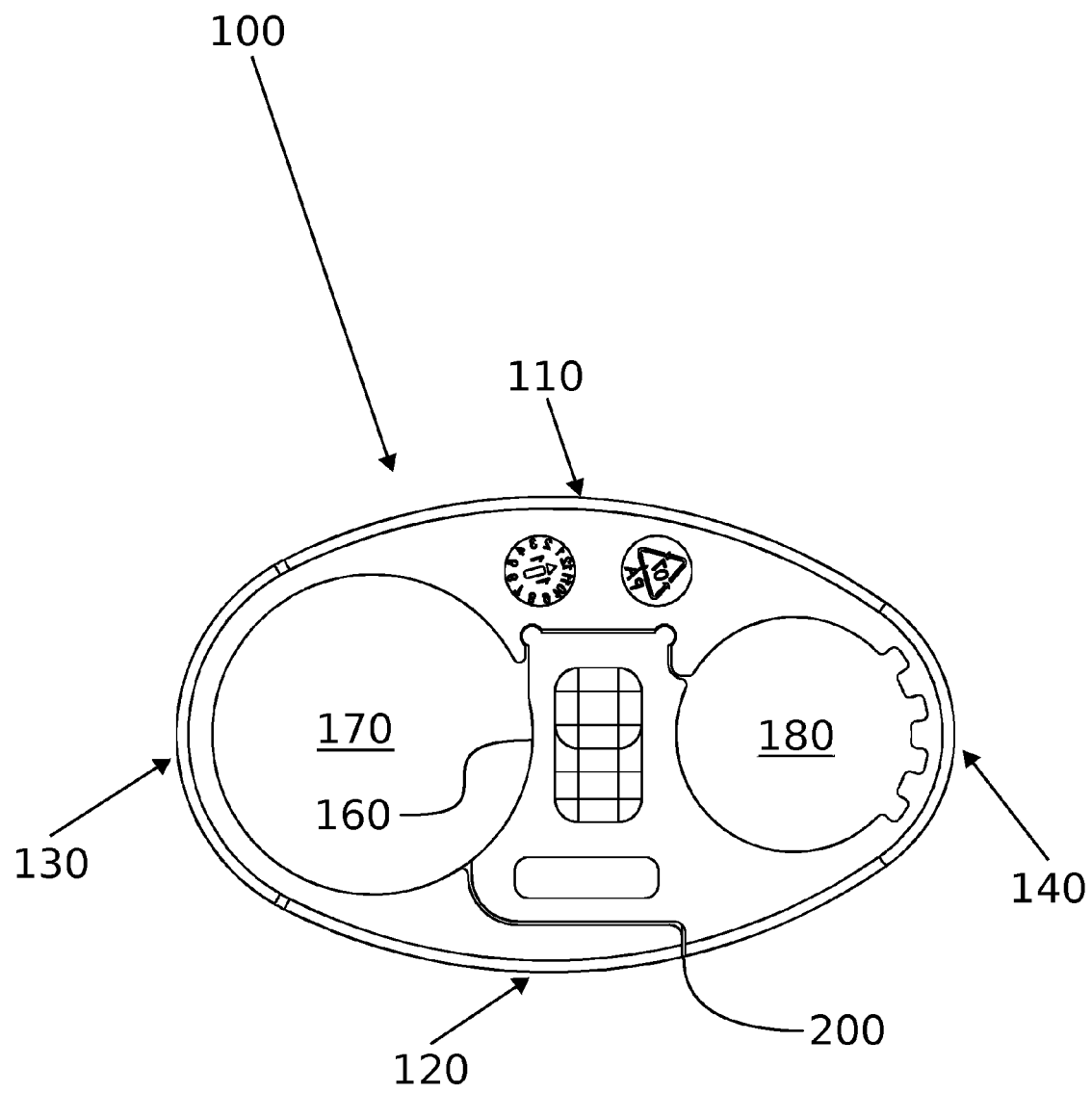
FIG. 4 presents the hinge body of FIG. 2 in a closed position.
Figure 6:
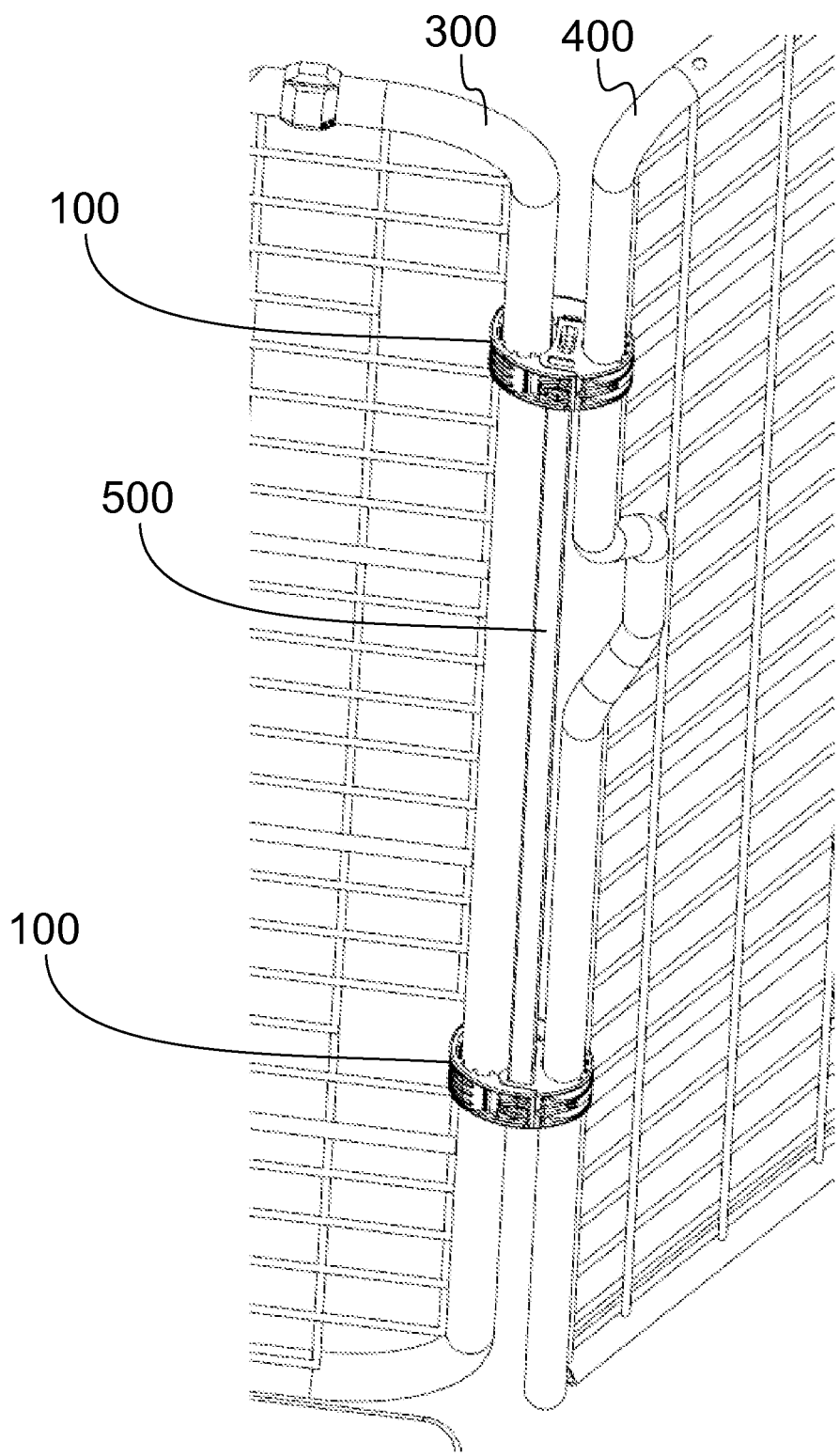
FIG. 6 presents an isometric view of the hinge body of FIG. 5 as part of a hinge assembly of two hinge bodies and a torsion bar.
Figure 7:
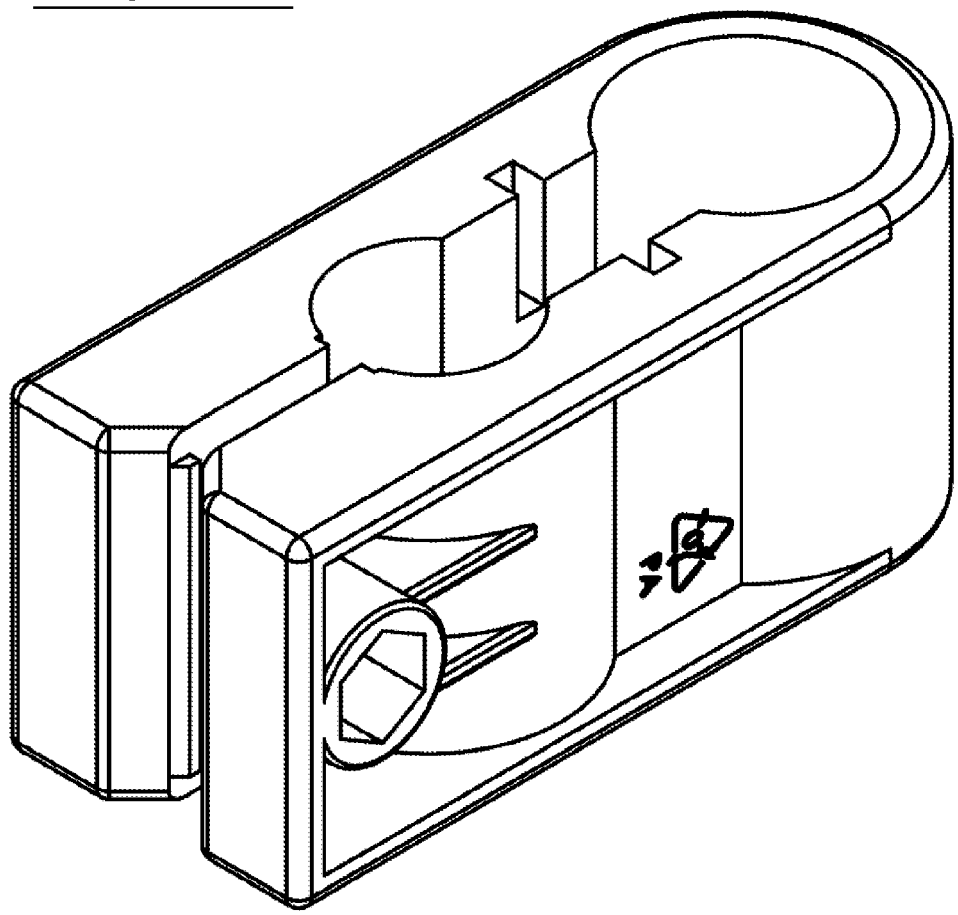
FIG. 7 presents an isometric view of a hinge body according to the prior art.

As can also be seen from FIGS. 2 to 4, the terminal ends 150, 160 have been provided with holes 153, 163 which are parallel to the apertures 170, 180 for the profiles. The holes 153, 163 are provided with corresponding parts of the terminal ends 150, 160 such that they are aligned when the body 100 is in closed position, i.e. when the terminal ends 150, 160 are joined. The through hole of the hinge body 100 formed by the consecutive holes 153, 163 enables the use of a torsion bar 500 (FIG. 6) which may be inserted through the consecutive holes 153, 163 of the terminal ends 150, 160 to secure the terminal ends 150, 160 to each other, thus improving the torsional integrity of the hinge. Also, when a hinge assembly for pivoting two parallel profiles is formed by two superposed hinge bodies, a long torsion bar 500 may be used to join the superposed hinge bodies, which keeps the hinge bodies aligned and to some extent improves the torsional stiffness of the whole hinge assembly.

Figure 5:
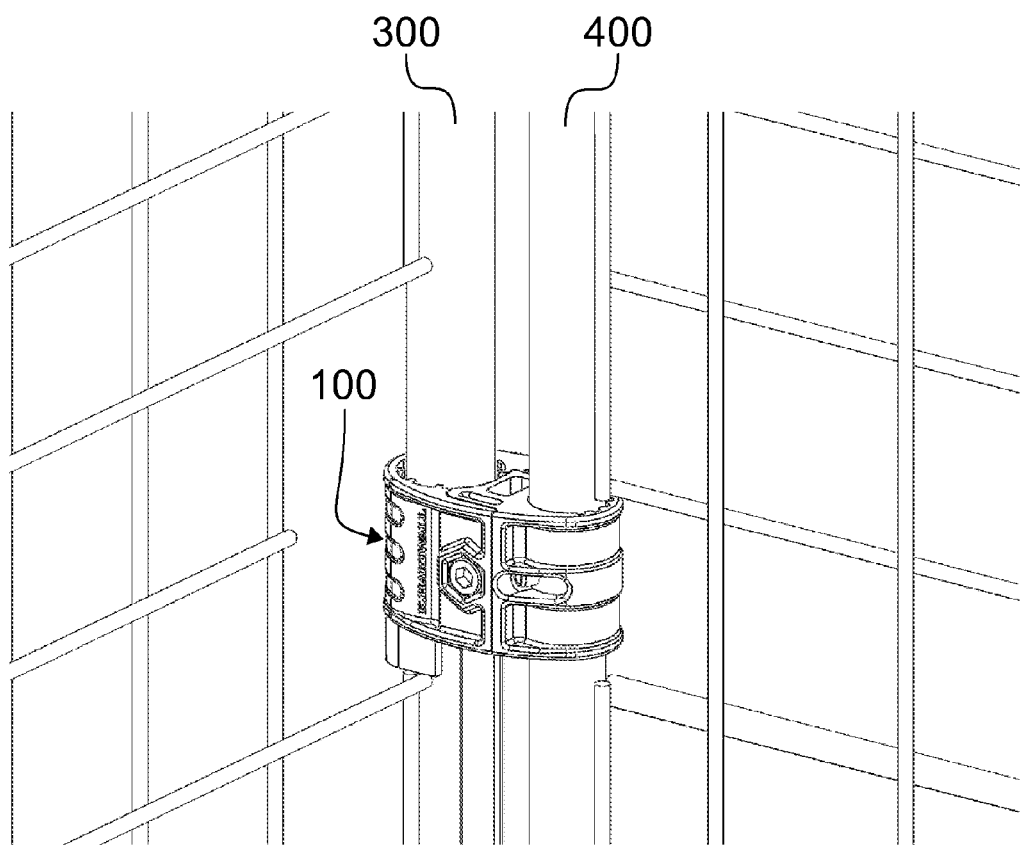
FIG. 5 presents an isometric view of inner side of the hinge body of FIG. 1 in a closed position joining a side wall section and a door of a roll container, i.e. from inside the roll container.

As is best visible in FIGS. 1, 3, and 5, the hinge body particularly includes a through hole 190 provided between the outer and inner portions 110, 120, wherein the hole 190 penetrates the joined terminal ends 150, 160 in a direction which is orthogonal to the axial direction of the apertures 170, 180 for profiles 300, 400. The through hole 190 provides a passage way for means for further securing the closed position of the hinge body 100. Said means may be established with a bolt and nut (as shown in FIG. 5), locking pin, a tie, such as a cable tie, or a similar fixing apparatus for securing the hinge body 100 into a closed position. Said means also hold the torsion bar 500 in place.

The invention claimed is:

1. A one-piece hinge body for pivoting two parallel profiles, the hinge body comprising:
    a first profile portion configured to at least partially enclose a first profile,
    a second profile portion configured to at least partially enclose a second profile parallel to the first profile,
    an outer portion connecting the first and second profile portions and being located on the outside of a hinge joint of the pivoted profiles, and
    an inner portion opposing the outer portion, connecting the first and second profile portions and being located on the inside of the hinge joint of the pivoted profiles, where the inner portion consists of respective joinable terminal ends, each associated with one of the first and second profile portions, wherein a mating surface is formed between said terminal ends when joined, and wherein the outer portion is solid; where
    the terminal ends comprise corresponding holes that are parallel to apertures for enclosing the profile portions and that are aligned when the body is in closed position, and wherein the terminal ends may be secured to each other by means of a torsion bar inserted through consecutive holes of the terminal ends.

2. The one-piece hinge body according to claim 1 made from elastic material, such that:
    the body is capable of being alternately opened to receive the profiles and closed for enclosing said profiles, and
    a sliding fit is formed between the hinge body and the respective profiles, whereby a hinge is formed between said respective profiles.

3. The one-piece hinge body according to claim 1, wherein one of the terminal ends comprises an extension adapted to engage with an inner surface of the outer portion and shaped to partially define apertures for enclosing the parallel profiles, wherein the body comprises two parallel said apertures for receiving the parallel profiles, the apertures being separated by the extension.

4. The one-piece hinge body according to claim 3, wherein the other terminal end is adapted to close the body by coupling to the terminal end comprising said extension.

5. The one-piece hinge body according to claim 3, including cooperating snap fit contours for securing the second profile.

6. The one-piece hinge body according to claim 5, wherein cooperating snap fit contours are provided to the mating surfaces of the joined terminal ends for securing the first profile in the aperture thus formed.

7. The one-piece hinge body according to claim 1, wherein the body comprises
- a through hole provided between the outer and inner portions, wherein the hole penetrates the joined terminal ends in a direction orthogonal to the axial direction of the apertures for profiles for providing
- a passage for further securing the closed position of the hinge body.

8. The one-piece hinge body of claim 1 positioned in a hinge assembly for pivoting two parallel wall section profiles of a logistics load carrier.

9. The one-piece hinge body according to claim 8, wherein the assembly comprises at least two hinge bodies superposed in relation to each other such that a torsion bar is arranged to connect the superposed hinge bodies through aligned torsion bar holes.

* * * * *